(12) United States Patent
Itkin

(10) Patent No.: US 8,600,319 B2
(45) Date of Patent: Dec. 3, 2013

(54) FEEDBACK RECEIVER FOR ANTENNA TUNER CALCULATIONS

(75) Inventor: Grigory Itkin, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 82 days.

(21) Appl. No.: 13/273,563

(22) Filed: Oct. 14, 2011

(65) Prior Publication Data
US 2013/0094556 A1    Apr. 18, 2013

(51) Int. Cl.
*H04B 1/02* (2006.01)
*H04B 17/00* (2006.01)

(52) U.S. Cl.
USPC ........................................ 455/107; 455/115.1

(58) Field of Classification Search
USPC .............. 455/107, 115.1, 126, 115.4, 248.1; 330/105, 110, 86, 282
See application file for complete search history.

(56) References Cited

U.S. PATENT DOCUMENTS

| | | | |
|---|---|---|---|
| 4,965,607 A | 10/1990 | Wilkins et al. | |
| 5,874,921 A | 2/1999 | Doherty et al. | |
| 7,088,967 B2 | 8/2006 | Hildebrand et al. | |
| 7,359,681 B2 * | 4/2008 | Cho | 455/107 |
| 8,131,232 B2 * | 3/2012 | Muhammad | 455/114.2 |
| 8,170,505 B2 * | 5/2012 | Keerti et al. | 455/107 |
| 8,170,509 B2 * | 5/2012 | Norris et al. | 455/115.4 |
| 8,311,495 B2 * | 11/2012 | Norris et al. | 455/115.4 |
| 2002/0123363 A1 | 9/2002 | Hildebrand et al. | |
| 2006/0025088 A1 | 2/2006 | Pietig et al. | |
| 2007/0232249 A1 | 10/2007 | Kwon et al. | |
| 2009/0225897 A1 | 9/2009 | Toyota et al. | |
| 2009/0253385 A1 | 10/2009 | Dent et al. | |
| 2011/0254751 A1 * | 10/2011 | Bengtsson | 343/860 |

FOREIGN PATENT DOCUMENTS

WO    2009124874 A1    10/2009

OTHER PUBLICATIONS

Non-Final Office Action dated Sep. 9, 2012 for U.S. Appl. No. 13/081,694.
Notice of allowance dated Jan. 28, 2013 for U.S. Appl. No. 13/081,694.
U.S. Appl. No. 13/081,694, filed Apr. 7, 2011.
Qizheng Gu, et al.; "An Analytical Algorithm for Pi-Network Impedance Tuners"; IEEE; 2011; p. 1-12.
U.S. Appl. No. 13/800,399, filed Mar. 13, 2013. 25 Pages.

* cited by examiner

*Primary Examiner* — Sonny Trinh
(74) *Attorney, Agent, or Firm* — Eschweiler & Associates, LLC

(57) ABSTRACT

Some embodiments of the present disclosure relate to a feedback receiver comprising a threshold comparator configured to determine if the amplitude of a baseband signal is within a selection corridor (e.g., defined by an upper and lower threshold value). If the amplitude is within the selection corridor, a feedback receiver is configured to accumulate RF signal samples (e.g., amplitude and phase samples) over a time period. The accumulated RF signal samples, which correspond to substantially constant baseband amplitude values, are then averaged. The calculated averages are utilized for impedance measurements used tune an antenna tuner to limit impedance mismatch. By limiting RF amplitude and phase sample collection to associated baseband signals having an amplitude falling within the selection corridor, substantially equal average amplitudes and phases can be achieved over a relatively short measurement period (i.e., without the need for long measurement period).

20 Claims, 4 Drawing Sheets

FEEDBACK RECEIVER FOR ANTENNA TUNER CALCULATIONS

BACKGROUND

Modern communication units (e.g., mobile phone hand sets) include integrated antennas configured to transmit and receive radio frequency (RF) signals. Integrated antennas are sensitive to external use cases (e.g., whether a hand is positioned on the phone, the position of a hand on the phone, etc.) that alter the impedance of the integrated antenna, leading to an impedance mismatch between the antenna and RF circuitry within a transmitter. Such an impedance mismatch can degrade the power radiated by a communication unit and increase the communication unit's sensitivity to noise. From a user's perspective, impedance mismatches can ultimately lead to a reduction in talk time or a dropped call. To provide better matching between RF circuitry in the transmitter and the antenna, handset designers use antenna tuners.

Conventionally, handset designers have arranged sensors inside the phone's package to detect the presence or absence of external use cases in an environment. Then the detected environment is compared with known use cases (e.g., "free space", "hand on the phone", "close to head", "metal plate"...) and a corresponding predetermined antenna tuner setting is chosen based on the detected use case. Unfortunately, this conventional approach requires a large number of sensors inside the mobile phone, which increases the phone's size and cost (particularly if there are a large number of possible use cases to be detected). Alternatively, a feedback receiver may be configured to determine an impedance of an output signal from a measured amplitude and phase of the output signal, and to adjust the antenna tuner settings based upon the determined impedance.

DETAILED DESCRIPTION

Figure 1:
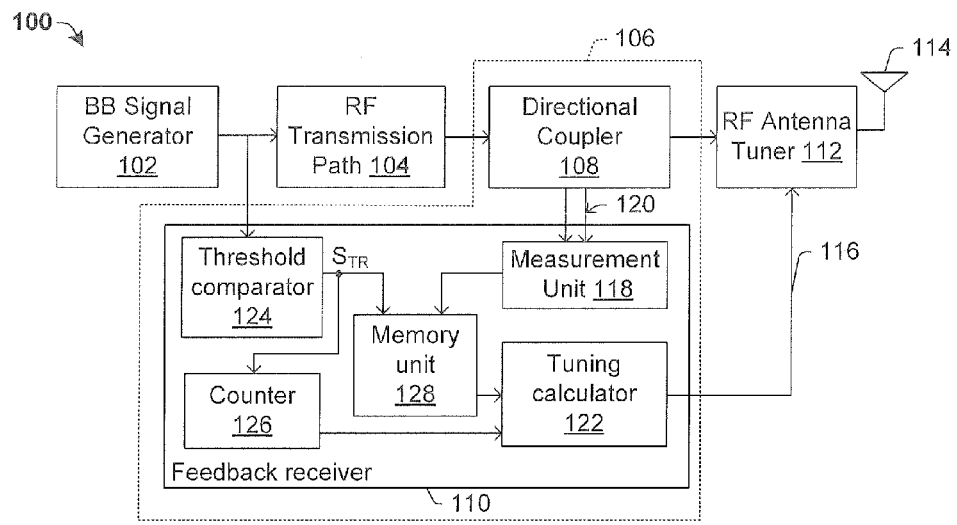
FIG. 1 is a block diagram of a transmitter having a feedback receiver that is selectively operated based upon an amplitude of a baseband signal to determine an impedance mismatch.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

The inventor has appreciated that for feedback receivers configured to determine an impedance mismatch from a measured output signal amplitude and phase, the feedback receiver has to average output signal measurements over a long period of time to reduce measurement errors. If conditions of the transmitter are substantially the same, the averages should provide a single impedance measurement value. However, wide variations in signal amplitude values (e.g., for signals with amplitude modulation) along with other practical limitations (e.g., limits on measurement time and/or the size of memory used to store the measurements) result in different averages that make for widespread impedance measurement values for the same conditions, and which therefore cause inaccuracies in the feedback receiver operation.

Accordingly, some embodiments of the present disclosure relate to a feedback receiver having a short measurement time and high accuracy for antenna tuner calculations. In particular, the feedback receiver is configured to selectively accumulate samples of an RF signal based upon an amplitude of a corresponding baseband signal, and to determine an impedance mismatch from the accumulated samples. In some embodiments, the feedback receiver comprises a threshold comparator configured to determine if the amplitude of a baseband signal is within a selection corridor (e.g., defined by an upper and lower threshold value). If the amplitude is within the selection corridor, a feedback receiver is configured to accumulate RF signal samples (e.g., amplitude and phase samples), provided by a two way directional coupler located between a radio frequency (RF) transmitter output and an antenna tuner, over a time period. The accumulated RF signal samples, which correspond to constant or close to constant baseband amplitude values, are then averaged. The calculated averages are utilized for impedance measurements that are used to tune an antenna tuner to limit impedance mismatch. By limiting the collection of RF amplitude and phase samples to associated baseband signals having an amplitude falling within the selection corridor, substantially equal average amplitudes and phases can be achieved in a relatively short measurement period (i.e., without the need for long measurement period). The substantially equal averages provide for substantially equal impedance measurement values that result in high accuracy antenna tuner calculations.

FIG. 1 illustrates a block diagram of a transmitter 100 in accordance with some embodiments. The transmitter 100 includes a baseband signal generator 102 configured to generate a baseband signal. The baseband signal is provided to an RF transmission path 104. The RF transmission path 104 converts the baseband signal to an RF signal that is subsequently provided to an RF antenna 114 for transmission while the transmitter is subject to a number of different use cases that may cause impedance mismatch between the RF antenna 114 and the RF transmission path 104.

To limit impedance mismatch, the transmitter 100 comprises analysis circuitry 106 that is operated to determine an impedance mismatch between the RE transmission path 104 and the RF antenna 114 based upon RF signal samples that are selectively collected based upon an amplitude of the baseband signal. In one embodiment, the analysis circuitry 106 includes a directional coupler 108 coupled between the RF transmission path 104 and an RF antenna tuner 112. The directional coupler 108 is configured to couple out a small part of the RF signal from the transmission path 104 and to split this small part of the RF signal into two parts on paths 120. A measurement unit 118 is configured to measure forward propagating waves and reflected waves on paths 120.

The analysis circuitry 106 further includes a threshold comparator 124 configured to receive an amplitude/magnitude of the baseband signal and to compare the received amplitude/magnitude to a selection corridor defined by upper and lower threshold values. In one embodiment, the threshold comparator 124 is coupled between the baseband signal generator 102 and the RF transmission path 104. If the amplitude/magnitude of the baseband signal falls within the selection corridor, the threshold comparator 124 generates a trigger signal $S_{TR}$. The trigger signal $S_{TR}$ is provided to a memory element 128 and a counter 126. The trigger signal $S_{TR}$ causes the memory element 128 to accumulate amplitude and phase sample of an associated RF signal, as measured by the measurement unit 118 on paths 120. Over a time period, the memory element 128 collects a plurality of RF signal samples which correspond to substantially constant baseband amplitude values (i.e., amplitude values within the selection corridor). The trigger signal $S_{TR}$ also causes the counter 126 to increment its value to track the number of accumulated RF signal samples in the memory element 128.

When the time period is exceeded (e.g., when the number of measurements exceeds a predetermined number), the counter 126 causes a tuning calculator 122 to analyze the measured samples accumulated in the memory element 128. To reduce the measurement errors and increase the impedance precision, the tuning calculator 122 is configured to average the accumulated amplitude and phase values. Sample accumulation is done twice (e.g., during a first time period and a second time period) per timeslot resulting in four average values (e.g., two amplitude and two phases). In one embodiment, samples are first accumulated for a forward propagating wave and then the memory unit 128 and counter 126 are reset to zero and the same procedure is repeated for a reflected wave. Based on these averaged values, the tuning calculator 122 generates a control signal 116 that is provided to the RF antenna tuner 112, which changes its impedance in response to the control signal 116 to limit impedance mismatch between the RF antenna 114 and RF transmission path 104 for a given use case. The control signal 116 may be updated from time to time to reflect changes in use cases and/or frequency, thereby helping to keep the antenna 114 "tuned" to the RF transmission path 104 on a relatively continuous basis.

Figure 2:
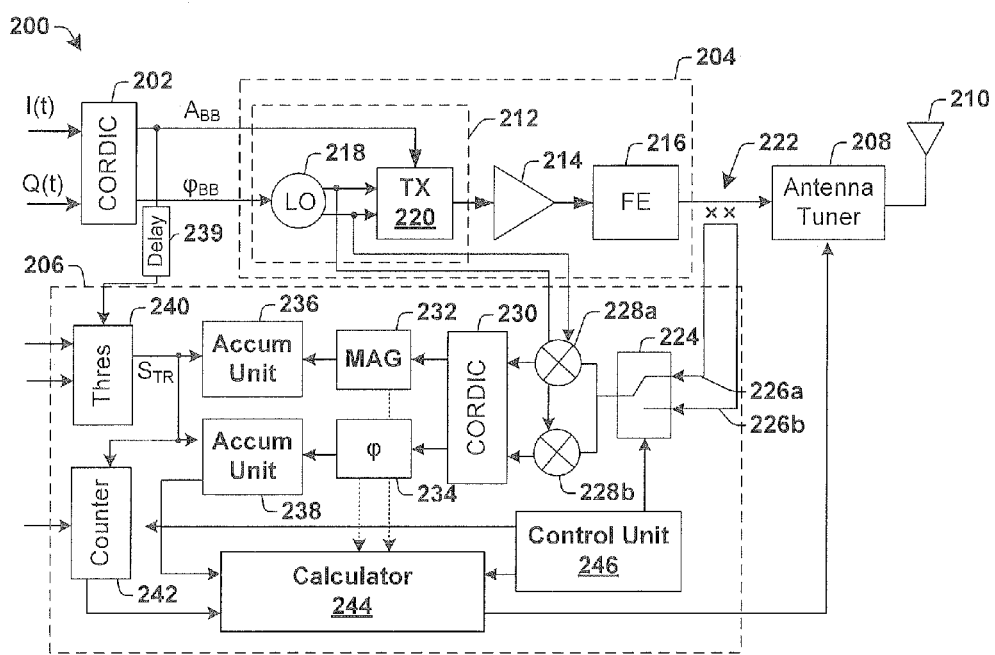
FIG. 2 is a block diagram of a transmitter that includes a polar modulator in accordance with some embodiments.

FIG. 2 is a block diagram of a more particular embodiment of a disclosed transmitter comprising a polar modulator. The transmitter 200 includes a first CORDIC 202, which is configured to receive in-phase (I(t)) and quadrature phase (Q(t)) signal components. The first CORDIC 202 converts the I(t) and Q(t) signal components from a Cartesian format to a polar equivalent amplitude signal $A_{BB}$ and phase signal $\phi_{BB}$, which are sent as baseband signals to the RF transmission path 204. The RF transmission path 204 includes a modulator 212, comprising a local oscillator (LO) 218 and a polar modulator 220, which is configured to up-convert the amplitude and phase baseband signals $A_{BB}$, $\phi_{BB}$ to an RF signal having amplitude and phase modulation, which is provided to a power amplifier 214 and then to an analog front end 216. Because the amplitude modulation is controlled by the amplitude baseband signal, selective sampling of the RF signal, based upon the amplitude baseband signal $A_{BB}$, enables more precise impedance calculations over a short time period.

A threshold comparator 240 is configured to receive the amplitude component of the baseband signal (i.e., the amplitude signal $A_{BB}$) output from the first CORDIC 202. A delay element 239 is configured to compensate for the propagation delay in RF units (e.g., 214-216, and 220-234) (i.e., without the delay element 239, the samples accumulated by accumulation units 236 and 238 will not represent the baseband amplitude value detected in threshold comparator 240). The threshold comparator 240 determines if the amplitude of the baseband signal is within a selection corridor defined by an upper and a lower threshold values. If the amplitude signal $A_{BB}$ is within the selection corridor, the threshold comparator 240 generates a trigger signal $S_{TR}$ that is provided to a first accumulation unit 236 (e.g., for amplitude samples), a second accumulation unit 238 (e.g., for phase samples), and a counter 242. The trigger signal $S_{TR}$ causes the first and second accumulation units to respectively accumulate measured RF signal amplitude and phase samples associated with the baseband signal. The trigger signal $S_{TR}$ also increments the counter 242, thereby tracking a number of accumulated samples stored in the first and second accumulation units.

As illustrated in FIG. 2, RF signal amplitude and phase samples are measured by way of a directional coupler 222 that is coupled to the feedback receiver 206 via a switch 224. The switch 224, under the direction of a control unit 246, provides forward propagating and reflected waves to the feedback receiver 206 from the directional coupler 222. The waves pass through first and second mixers, 228a and 228b, and to a second CORDIC 230. In one embodiment, the second CORDIC 230 is configured to calculate amplitude and phase samples every clock period, and when the baseband signal has an amplitude that falls within the selection corridor the amplitude and phase values are accumulated in first and second accumulation units 236 and 238.

For example, during operation, when the control unit 246 enables a first output 226a of the directional coupler 222, the second CORDIC 230 outputs amplitude and phase samples of forwarded signals to magnitude and phase registers, 232 and 234, over a first time period. During each clock period of the first time period, the amplitude of the baseband signal is compared to a selection corridor. If the amplitude of the baseband signal is within the selection corridor, the threshold comparator 240 generates a trigger signal $S_{TR}$ that causes the first and second accumulation units, 236 and 238, to accumulate a corresponding measured RF signal amplitude and phase sample. If the amplitude of the baseband signal is not within the selection corridor, the threshold comparator 240 does not send the trigger signal $S_{TR}$ and the corresponding RF signal amplitude and phase sample is not accumulated. Such selective accumulation is performed for a plurality of forward wave samples over the first time period, allowing for a plurality of phase and amplitude samples to be stored for clock periods in which an amplitude of the baseband signal is within the selection corridor (i.e., has a substantially constant value). At the end of the first time period (e.g., at the middle of a timeslot), the accumulated forward wave amplitude and phase samples are averaged and read into a calculator 244.

The accumulation units, 236 and 238, are then reset and the control unit 246 subsequently enables a second output 226b of the directional coupler 222, allowing registers 232 and 234 to store reflected amplitude and phase samples output by the second CORDIC 230 over a second time period. During each clock period of a second time period, the amplitude of the baseband signal is compared to the selection corridor. It will be appreciated that for baseband signals signal in first and second time periods, the selection corridor is selected to be the same so that baseband amplitude samples have constant values over both time periods. If the amplitude of the baseband is within the selection corridor, the threshold comparator 240 generates a trigger signal $S_{TR}$ that causes the first and second accumulation units, 236 and 238, to accumulate a corresponding measured RF signal amplitude and phase sample. If the amplitude of the baseband signal is not within the selection corridor, the threshold comparator 240 does not send the trigger signal. Such selective accumulation is performed for a plurality of reflected wave samples over the second time period. At the end of the second time period (e.g., at the end of a timeslot), the accumulated reflected wave amplitude and phase samples are averaged and read into the calculator 244.

In one embodiment, the first and second time periods are defined as a time it takes for a number of amplitude and phase samples to reach a predetermined number "M" (e.g., M=128). When the predetermined number "M" is reached, the counter 242 will send a signal to the calculator 244 indicating that a sufficient number of samples have been received. In another embodiment, the counter 242 is configured to send the number of collected samples after a given time period (e.g., 20 μs) has elapsed, so that the calculator 244 can perform a calculation of the impedance of the system based upon the collected number of samples.

When the calculator 244 (which is often implemented in software running on a microprocessor) receives a signal from the counter 242, it generates a control signal, based on the average phase and amplitude values for the forward-propagating and reflected waves, which is provided to the antenna tuner 208. The tuning signal adjusts the impedance of the antenna tuner 208 to limit any impedance mismatch between the analog front end 216 and the antenna 210.

It will be appreciated that although FIG. 2 illustrates the accumulation units as comprising separate logic elements, in various other embodiments, the accumulation units may be comprised as part of another component of the feedback receiver. For example, in an embodiment, the accumulation units, 236 and 238, may be realized inside the calculator 244 as registers (illustrated as direct connections from registers 232 and 234 to calculator 244).

Figure 3:
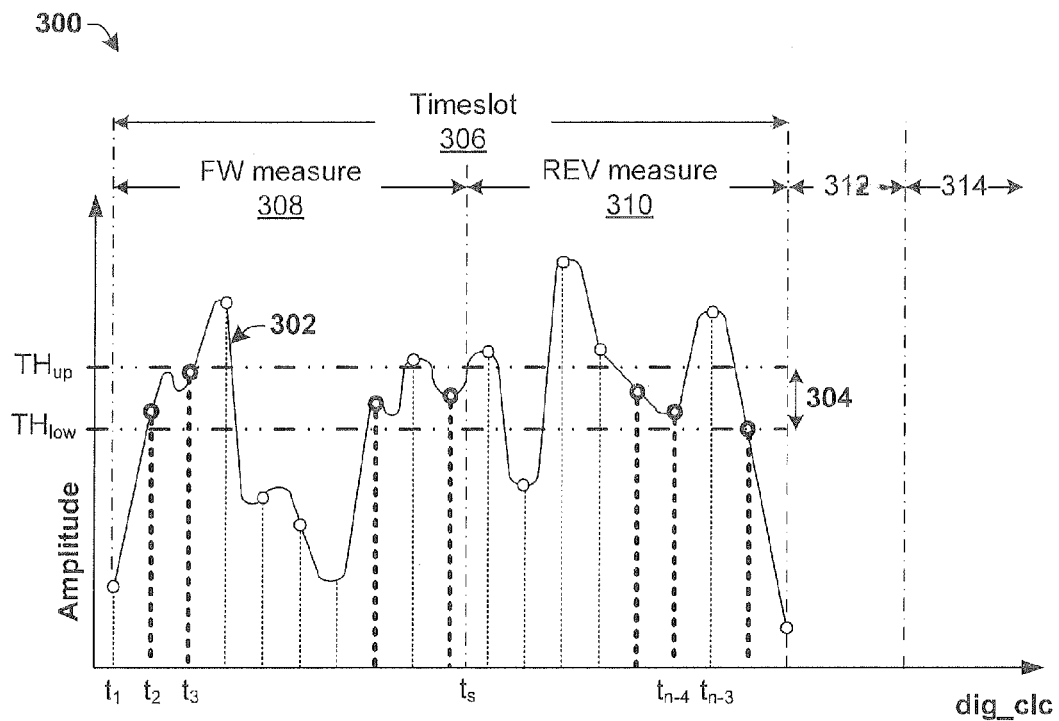
FIG. 3 is a graph showing an exemplary baseband signal, illustrating a comparison of the amplitude of a baseband signal to one or more threshold values.

FIG. 3 is a graph 300 showing an exemplary baseband signal having amplitude modulation. In particular, FIG. 3 illustrates a comparison of the baseband signal amplitude to a selection corridor comprising two threshold values (e.g., as done by threshold comparator 240 in FIG. 2). In particular, graph 300 illustrates the amplitude of the baseband signal on the y-axis and time on the x-axis (measured in digital clock periods).

As illustrated in graph 300, the baseband signal 302 is shown over a timeslot 306, which may be assigned to a transmitter via a base station or other wireless communication device. Since a feedback receiver cannot be switched quickly to measure forward propagated or reflected signals (e.g., since it includes filters and/or amplifiers having a slow response time), switching between measurements of forward propagated and reflected waves may be done once per timeslot (e.g., switched once in the middle of the timeslot 306). For example, during a first time period 308, a transmitter can set its directional coupler (e.g., corresponding to directional coupler 222 in FIG. 2) to propagate a forward wave through the transmitter's feedback receiver, while during a second time period 310, the transmitter can set its directional coupler to propagate a reflected wave through the transmitter's feedback receiver.

During operation, a threshold comparator is configured to compare the amplitude of the baseband signal with a selection corridor 304 defined by a first, upper threshold value ($TH_{up}$) and a second, lower threshold value ($TH_{low}$). If the amplitude of the baseband signal 302 is within the selection corridor 304, then a measurement of the amplitude and phase samples of an associated RF signal is accumulated (e.g., by accumulation units 236 and 238 in FIG. 2).

For example, at a first clock period $t_1$, the baseband signal 302 has an amplitude value that falls outside of the selection corridor 304, causing no forward propagated wave amplitude and phase samples to be accumulated and a counter is not incremented. At a second clock period $t_2$, the baseband signal 302 has an amplitude that falls within the selection corridor 304. Since the amplitude of the baseband signal falls within the selection corridor 304, a measured amplitude sample of a forward propagated RF signal is stored in a first accumulation unit, a measured phase propagated of the forward propagated wave is stored in a second accumulation unit, and a counter is incremented to a first value (e.g., 1). During a third clock period $t_3$, the baseband signal 302 again has an amplitude that falls within the selection corridor 304, so that measured amplitude and phase samples of a forward propagated RF signal are added to the first accumulation unit (already storing an amplitude sample) and the second accumulation unit (already storing a phase sample), and the counter is incremented to a second value (e.g., 2). When a sufficient number of "M" samples are accumulated (or a predetermined time has elapsed), the first time period 308 ends and the calculator divides the accumulated phase and amplitude values by "M" (or N<M) to determine average values of amplitude and phase of the accumulated forward propagated waves over the first time period 308.

At a later time $t_s$ (e.g., in the middle of the timeslot 306) reflected waves are measured. The amplitude of the baseband signal 302 is compared to a selection corridor 304 (e.g., the same corridor used for forwarded waves) and amplitude and phase samples of the reflected RF signal propagating through the directional coupler are correspondingly measured and selectively accumulated (e.g., at clock period $t_{n-4}$, a baseband signal has an amplitude sample that falls within of the selection corridor, causing amplitude and phase values to be accumulated and the counter is incremented, while at clock period $t_{n-3}$, a baseband signal has an amplitude value that falls outside of the selection corridor, causing amplitude and phase sample not to be accumulated and the counter not to be incremented).

Based on averages of the forward propagated and reflected samples accumulated during the timeslot 306, at time 312 the transmitter calculates a change in impedance that will limit impedance mismatch between an RF transmission path and an RF antenna. Subsequently, at time 314 the transmitter implements the change.

Accordingly, restricting measurements of the RF signal amplitude and phase to baseband signals having an amplitude falling within the selection corridor 304 can be seen as taking a measurement from a signal without amplitude modulation (e.g., which is an ideal measurement case) or as a result of long time filtering with narrow band LPF, where the amplitude modulation component is sufficiently removed.

It will be appreciated that the size of the selection corridor 304 may be varied (e.g., by varying the upper and lower threshold values) to effectuate transmitter operation in various embodiments. However, there is a tradeoff between the size of selection corridor 304, measurement time, and impedance accuracy. The bigger the selection corridor 304, the faster measured samples will accumulate, but the larger the impedance measurement error. If the selection corridor is selected to be very narrow (e.g., 1 unit), then a single measurement in first time period and another one in the second period will be enough for an absolute precise impedance calculation. However, since no samples may fall into such a very narrow selection corridor, the selection corridor is often made wider and an average of several measured samples is implemented. In one embodiment, to reduce the measurement time and increase the probability of baseband samples being inside the selection corridor 304, the upper and lower threshold values, $TH_{up}$ and $TH_{low}$, may be selected to be symmetrically around the RMS value of baseband signal 302 (e.g., +/−2.5% around baseband RMS value).

Figure 4:
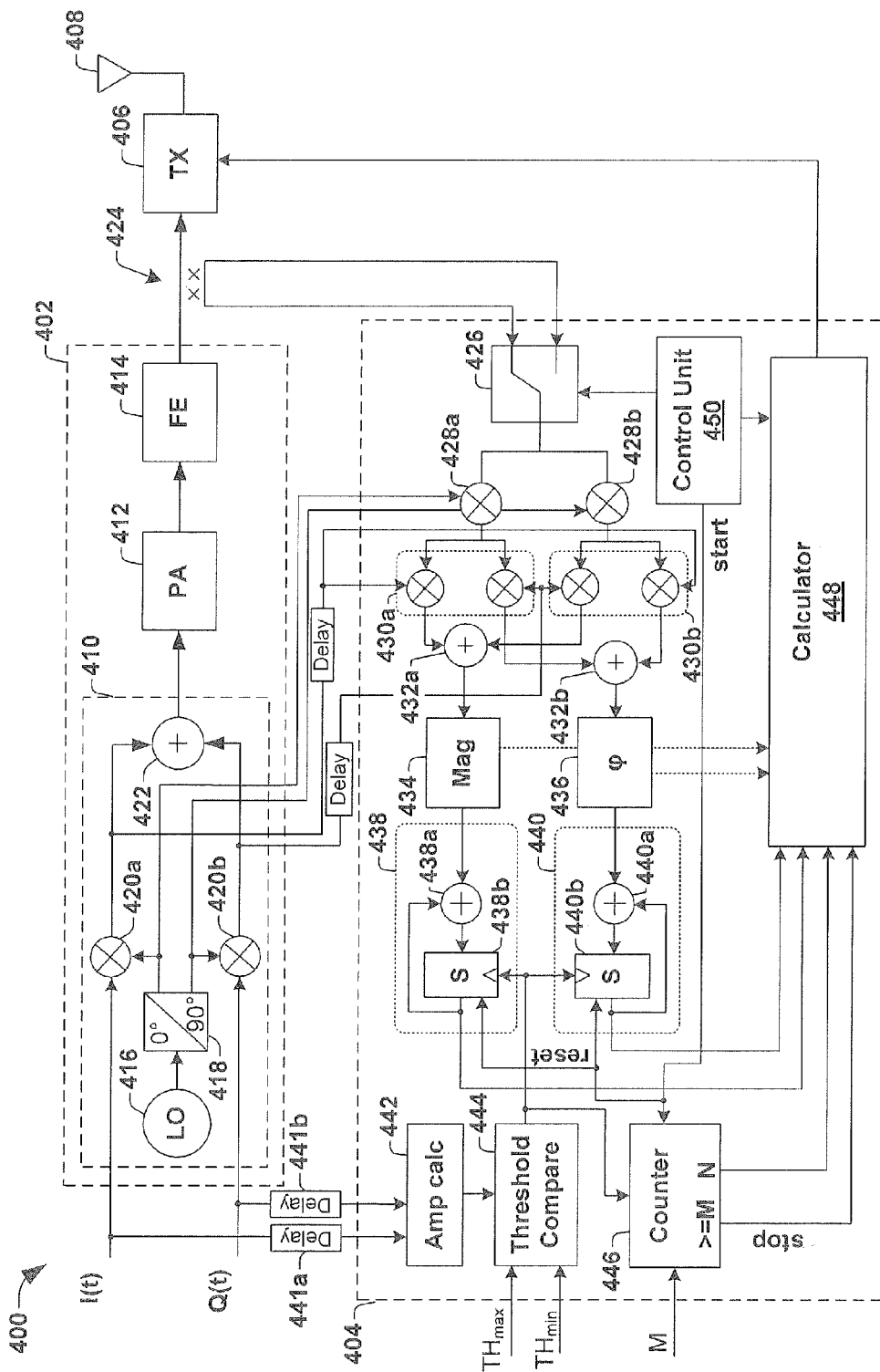
FIG. 4 is a block diagram of a transmitter that includes an IQ modulator in accordance with some embodiments.

FIG. 4 illustrates an alternative embodiment of a disclosed transmitter 400 comprising a transmission path 402 having an IQ modulator 410. The IQ modulator 410 includes a local oscillator 416, a 90° phase shift module 418, first and second mixers 420a and 420b, and a summation element 422. The first and second mixers 420a and 420b are configured to receive baseband in-phase (I(t)) and quadrature phase (Q(t)) signals and to convert the baseband I(t) and Q(t) signals to RF frequency signals, which are combined by the summation element and then provided as an IQ modulated RF stream to a power amplifier 412 and an analog front end 414.

A directional coupler 424 is coupled to the feedback receiver 404 by way of a switch 426 controlled by a control unit 450. The control unit 450 operates the feedback receiver 404 to selectively accumulate a plurality of RF signal amplitude and phase samples, corresponding to a baseband signal having a substantially constant amplitude, before calculating a control signal. When the control unit 450 passes a first output of the directional coupler 424 to the FBR, the forward propagating wave from the directional coupler 424 passes through first mixer and second mixers 428a and 428b and then a first pair of mixers 430a and a second pair of mixers 430b. One of the mixers of each of the first and second pairs of mixers are coupled to a first summation element 432a, and the other of the mixers of each of the first and second pairs of mixers are coupled to a second summation element 432b. The first and second summation elements are coupled to an amplitude and phase register 434 and 436.

An amplitude calculator 442 is configured to determine an amplitude of the I(t) and Q(t) baseband signals. The amplitude calculator 442 is connected to the baseband I(t) and Q(t) baseband signals via delay elements 441a and 441b. The delay elements, 441a and 441b, are configured to compensate for the propagation delay in RF units (e.g., 412-414 and 420-438). The amplitude is then provided to a threshold comparator 444, which determines if the amplitude of the baseband signal is within a selection corridor. When the amplitude is within the selection corridor, the threshold comparator 444 outputs a trigger signal at an output node to the first and second accumulation units 438 and 440, which are coupled to the output node. The trigger signal causes the first and second accumulation units 438 and 440 to receive the amplitude and phase values stored in the registers.

The first accumulation unit 438 contains a summation element 438a and a flip-flop 438b. The summation element 438a is configured to receive an amplitude sample at each clock period and to selectively add it to a feedback signal output from flip-flop 438b. In particular, the flip-flop 438b has a first input configured to receive an output of the summation element 438a, a clock input configured to receive a trigger signal output from the threshold comparator 444, and a reset input output from the control unit 450. When the trigger signal received at the clock input changes (e.g., goes from low to high), the output of the flip-flop is set equal to the first input signal. If the trigger signal received at the clock input doesn't change (e.g., remains low), the output of the flip-flop remains the same as in a previous clock period. Therefore, the trigger signal received at the clock input allows the accumulation unit 438 to accumulate a plurality of amplitude samples over a time period. If the "reset" signal is received at the reset input, the value accumulated in the flip-flop is reset (e.g., when a time period is over). The second accumulation unit 440 operates in substantially the same manner to accumulate phase samples over a time period.

In one embodiment, after collecting a number of samples the counter 446 is configured to generate a "stop" signal. The stop signal is provided to the calculator 448, which reads the accumulated amplitude and phase samples for the time period. The calculator 448 is configured to calculate an average values of amplitude and phase samples for forward propagated and reflected waves. In another embodiment, if the number of collected samples doesn't reach the predetermined number "M" within a predetermined time, then the counter 446 sends a "stop" signal and a number of accumulated samples "N" to the calculator 448. In one embodiment, the calculator 448 utilizes the "N" samples to calculate the average values. In another embodiment, the calculator 448 may extrapolate the received "N" samples to reach the predetermined number of samples "M" (e.g., repeat last stored amplitude and phase samples to reach the "M" number).

The control unit 450 subsequently changes the switch 426 so a second output of the directional coupler 424 is passed to the feedback receiver 404, and a reflected wave propagates through the mixers and summation elements, until being stored in accumulation elements. When the control unit 450 changes the switch 426 it generates a "start" signal which restarts the counter from 0 and which resets the accumulation units 438 and 440.

At the end of a timeslot the calculator 448 has average values for the forwarded and reflected amplitude and phases (e.g., Mag_for, Phase_for, Mag_ref, Phase_ref). From these average values, the calculator can calculate a complex admittance at the antenna tuner input according to the expressions (e.g., for a 50 ohm target impedance):

$$Y\_re\_tun = 1/50*(1+\text{Mag\_rel}*\text{COS}(Del\_Ph))$$

$$Y\_im\_tun = 1/50*\text{Mag\_rel}*\text{SIN}(Del\_Ph),$$

where Mag_rel=Mag_ref/Mag_for=a relation between two magnitudes, and Del_Ph=Phase_ref−Phase_for=difference between two phases. Because the current antenna admittance and the tuner's internal structure is known, the transmitter can calculate the new values for the tuner's elements to match the current antenna admittance to the wanted impedance (e.g., 50 Ohm). It will be appreciated that in the IQ modulation scheme of FIG. 4, the values of Mag_rel*COS(Del_Ph) and Mag_rel*SIN(Del_Ph) for PM transmitter are calculated automatically because of the working principle of FBR using a modulated local oscillator Based on the calculated admittance values, the calculator 448 (which is often implemented in software running on a microprocessor) generates a control signal that adjusts the impedance of the antenna tuner 406 to limit any impedance mismatch between the analog front end 414 and the antenna 408 for the timeslot and/or for subsequent timeslots.

Figure 5:
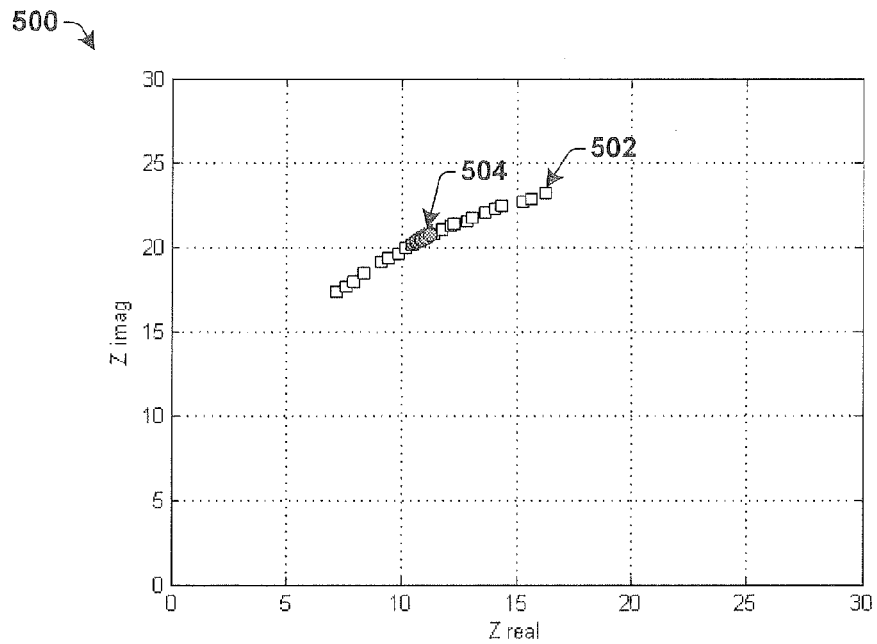
FIG. 5 is a graph illustrating a plurality of impedances measured according to a transmitter provided herein.

FIG. 5 shows a graph 500 of impedance measurements taken by a feedback receiver calculator (e.g., corresponding to calculator 448 in FIG. 4). In FIG. 5 the imaginary component of the impedance is shown on the y-axis and the real component of the impedance is shown on the x-axis.

Impedance measurements 502 are calculated from averages taken by a feedback receiver that does not utilize a threshold calculator. As illustrated in graph 500, the samples have a relatively large impedance spread that causes inaccuracies in impedance matching.

Impedance measurements 504 are calculated from averages taken by a feedback receiver that does utilize a threshold calculator (e.g., corresponding to threshold calculator in FIG. 4). In particular, the impedance measurements 504 were obtained using a selection corridor that is +/−2.5% around the baseband signal RMS value. The number of measured samples (M) is set to 128 and the predetermined time is limited to 20 us. By limiting the collection of RF amplitude and phase samples to associated baseband signals having an amplitude falling within the selection corridor, substantially equal average amplitudes and phases are achieved. The substantially equal averages provide for substantially equal impedance measurements. As illustrated in graph 500, impedance measurements 504 generated by a disclosed transmitter utilizing a threshold calculator have a low spread compared to impedance measurements 502 taken by a transmitter not utilizing a threshold calculator.

Figure 6:
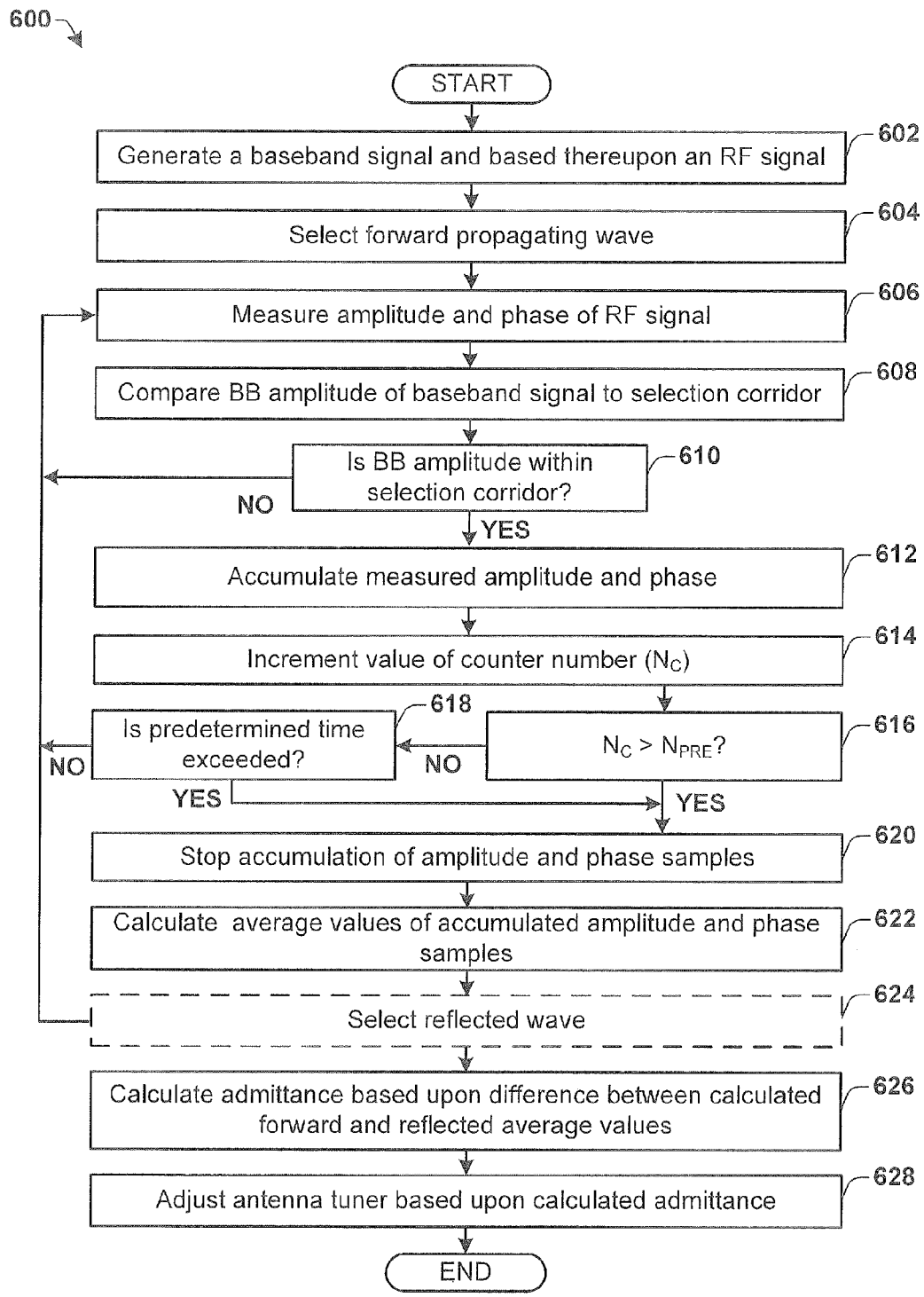
FIG. 6 is a flow diagram of an exemplary method for adjusting an antenna tuning in accordance with some embodiments.

FIG. 6 illustrates flow diagram of an exemplary method 600 for adjusting an antenna tuning in accordance with some embodiments. While this method 600 is illustrated and described below as a series of acts or events, the present disclosure is not limited by the illustrated ordering of such acts or events. The same is true for other methods disclosed herein. For example, some acts may occur in different orders and/or concurrently with other acts or events apart from those illustrated and/or described herein. In addition, not all illustrated acts are required, and one or more of the acts depicted herein may be carried out in one or more separate acts or phases.

The method 600 starts at 602, wherein a baseband signal is generated and an RF signal is generated from the baseband signal. In one embodiment, the baseband signal may comprise a polar signal having phase and amplitude components. In another embodiment, the baseband signal may comprise in-phase and quadrature phase components offset by 90°. The baseband signal is converted to a radio frequency (RF) signal that is subsequently transmitted via an antenna.

At 604 a forward propagating wave is selected. In one embodiment, a forward propagating wave is selected by enabling a first output of a directional coupler (e.g., directional coupler 108 in FIG. 1).

At 606 an amplitude and phase sample of an RF signal is measured. The amplitude and phase sample is taken during a clock period of a first time period.

At 608 an amplitude of a baseband signal associated with the amplitude and phase sample is compared to a selection corridor defined by upper and lower threshold values. The comparison ensures that the RF signal has an approximately constant amplitude.

At 610, if the amplitude of the baseband signal is not within the selection corridor, a measurement of an RF amplitude and phase is performed for a next clock period (at 604) of the time period and a comparison of an associated baseband signal is repeated (at 608). If the amplitude of the baseband signal is within the selection corridor, the measured amplitude and phase sample is accumulated at 612.

At 614 a counter value is incremented. Incrementation of the counter value keeps track of the number of accumulated amplitude and phase samples for a forwarded or reflected wave.

At 616, if the counter number ($N_C$) is greater than a predetermined number ($N_{PRE}$) accumulation of amplitude and phase samples is stopped at 620. If the counter number ($N_C$) is not greater than a predetermined number (NPRE), but a predetermined time is exceeded accumulation of the amplitude and phase samples is stopped at 620. If the counter number is not greater than the predetermined number and a predetermined time has not elapsed, the method returns to 606 and another amplitude and phase sample is measured in a next clock period of the time period.

At 622 average values of the accumulated amplitude and phase samples are calculated. In one embodiment, when a sufficient number of "M" measurements/samples have been taken, the average values of amplitude and phase samples accumulated over a time period is determined by dividing the accumulated phase and amplitude values by "M". In one embodiment, when a number of measurements "N"<"M" have been taken, but a predetermined time has elapsed, the average values of amplitude and phase samples accumulated over the predetermined time is determined by dividing the accumulated amplitude and phase samples by "N".

At 624, a reflected propagating wave is selected. In one embodiment, the reflected propagating wave is selected by enabling a second output of a directional coupler. Steps 606 to 622 are repeated for the reflected wave to determine an average value of an amplitude and phase of the reflected wave for a second time period (e.g., one half of a timeslot).

At 626, based on the average values of the accumulated amplitude and phase samples for forward propagating and reflected waves, an admittance is calculated. In one embodiment, a tuner input admittance can be calculated from the averages values and based on the tuner input admittance and the tuner's known structure (see e.g., FIG. 2), an admittance at the tuner output, which is equal to the admittance at RF antenna input is calculated.

At 628, the method adjusts an antenna tuner so the impedance of the RF transmission path matches the impedance of the RF antenna. In many embodiments, the impedance adjustment is made at a symbol boundary between two time slots to prevent the adjustment from corrupting the transmitted signal. In this way, a present antenna tuner setting is assumed to be valid until the transmission frequency is changed or until impedance mismatching exceeds a predetermined threshold. To check matching, measurements can be repeated from time to time even if the transmission frequency is constant. In some embodiments, calculations and antenna tuner updating can be performed only when a change in transmission frequency occurs or when high amounts of impedance mismatch occur.

Although the disclosure has been shown and described with respect to one or more implementations, equivalent alterations and modifications will occur to others skilled in the art based upon a reading and understanding of this specification and the annexed drawings. For example, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transmitter, comprising:
a baseband signal generator configured to generate a baseband signal;
a transmission path configured to convert the baseband signal to a radio frequency (RF) signal and to provide the RF signal to an RF antenna port for connecting to an RF antenna;
analysis circuitry coupled between the transmission path and the RF antenna port, wherein the analysis circuitry is selectively operated based upon an amplitude of the baseband signal to accumulate samples of the RF signal, to determine an impedance mismatch between the transmission path and the RF antenna from the accumulated samples, and to generate a control signal based on the determined impedance mismatch; and
an RF antenna tuner coupled between the analysis circuitry and the RF antenna port, wherein the RF antenna tuner is tuned to reduce the determined impedance mismatch according to the control signal generated by the analysis circuitry.

2. The transmitter of claim 1, wherein the analysis circuitry comprises:
a threshold comparator coupled between the baseband signal generator and the transmission path, wherein the threshold comparator is configured to output a trigger signal at an output node if the amplitude of the baseband signal is within a selection corridor defined by upper and lower threshold values; and
a memory element coupled to the output node and configured to accumulate amplitude and phase samples of the RF signal during clock periods in which the trigger signal is generated.

3. The transmitter of claim 2, wherein the analysis circuitry further comprises:
a counter configured to count a number of the accumulated amplitude and phase samples during a time period comprising a plurality of clock periods.

4. The transmitter of claim 2, wherein the analysis circuitry comprises:
a directional coupler coupled between the transmission path and the antenna tuner; and
a measurement unit configured to measure a plurality of amplitude and phase samples of a forward propagating wave provided by the directional coupler during a first time period, and further configured to measure a plurality of amplitude and phase samples of a reflected wave provided by the directional coupler during a second time period.

5. The transmitter of claim 4, wherein the memory element comprises:
a first accumulation unit coupled to the output node and configured to accumulate the measured amplitude samples for the forward propagating wave during clock periods in which the trigger signal is generated during the first time period and further configured to accumulate the measured amplitude samples for the reflected wave during clock periods in which the trigger signal is generated during the second time period; and
a second accumulation unit coupled to the output node and configured to accumulate the measured phase samples for the forward propagating wave during clock periods in which the trigger signal is generated during the first time period and further configured to accumulate the measured phase samples for the reflected wave during clock periods in which the trigger signal is generated during the second time period.

6. The transmitter of claim 5, wherein the analysis circuitry further comprises:
a calculator configured to generate the control signal based on average values of the accumulated amplitude and phase samples of the forward propagating wave and average values of the accumulated amplitude and phase samples of the reflected wave.

7. The transmitter of claim 6,
wherein the calculator determines the average values of the amplitude and phase samples of the forward propagating wave and of the reflected wave after a number of the accumulated amplitude and phase samples exceeds a predetermined number.

8. The transmitter of claim 6,
wherein the calculator determines the average values of amplitude and phase samples of the forward propagating wave and of the reflected wave after a predetermined time has elapsed.

9. The transmitter of claim 6, wherein the analysis circuitry further comprises:
a control unit coupled to the directional coupler and configured to set the directional coupler to a first state to measure the plurality of amplitude and phase samples of the forward propagating wave, and further configured to set the directional coupler to a second state to measure the plurality of amplitude and phase samples of the reflected wave;
first and second mixers having respective first inputs coupled to an output of the directional coupler and having respective second inputs to receive a local oscillator (LO) signal; and
a CORDIC coupled to the first and second mixers and configured to output amplitude and phase samples based on the output of the directional coupler.

10. The transmitter of claim 1, wherein the transmission path comprises:
a IQ modulator having an input and output;
a power amplifier having an input and output, wherein the input of the power amplifier is coupled to the output of the modulator; and
an analog front end having an input and an output, wherein the input of the analog front end is coupled to the output of the power amplifier and wherein the output of the analog front end is coupled to the RF antenna tuner.

11. The transmitter of claim 1, wherein the transmission path comprises:
a polar modulator having an input and output;
a power amplifier having an input and output, wherein the input of the power amplifier is coupled to the output of the modulator; and
an analog front end having an input and an output, wherein the input of the analog front end is coupled to the output of the power amplifier and wherein the output of the analog front end is coupled to the RF antenna tuner.

12. A method, comprising:
generating a baseband signal;
converting the baseband signal to a radio frequency (RF) signal transmitted via an RF antenna port;
comparing an amplitude of the baseband signal to a selection corridor, wherein if the amplitude is within the selection corridor a corresponding amplitude and phase sample of the RF signal is accumulated in a memory element;
calculating and storing average values of the amplitude and phase samples accumulated over a time period; and adjusting an admittance of an antenna tuner to set a matching condition between the antenna tuner and the RF antenna port based on the average values of the amplitude and phase samples.

13. The method of claim 12,
wherein a plurality of amplitude and phase samples are accumulated for a forward propagating wave during a first time period; and
wherein a plurality of amplitude and phase samples are accumulated for a reflected wave during a second time period, immediately after the first time period.

14. The method of claim 13, wherein the first time period and the second time period are both included in a timeslot assigned by a base station.

15. The method of claim 12, wherein calculating and storing average values comprises:
counting a number of accumulated amplitude and phase samples over the time period; and
dividing the accumulated amplitude or phase samples by the number of accumulated amplitude and phase samples.

16. The method of claim 15, wherein calculating the average values of the amplitude and phase samples is performed after the number of accumulated amplitude and phase samples exceeds a predetermined number.

17. The method of claim 15, wherein calculating the average values of the amplitude and phase samples is performed after a predetermined time has been exceeded.

18. A transmitter, comprising:
a baseband signal generator configured to generate a baseband signal;
a transmission path configured to convert the baseband signal to a radio frequency (RF) signal and to provide the RF signal to an RF antenna port configured to couple to an RF antenna;
an antenna tuner coupled downstream of the transmission path and upstream of the RF antenna port;
a threshold comparator configured to generate a trigger signal at an output node if an amplitude of the baseband signal is within a selection corridor defined by upper and lower threshold values;
a memory element configured to accumulate amplitude and phase samples of the RF signal during clock periods in which the trigger signal is generated;
a counter configured to count a number of accumulated amplitude and phase samples during a time period comprising a plurality of clock periods; and
a calculator configured to provide a control signal to tune the antenna tuner, wherein the control signal is based on average values of the accumulated amplitude and phase samples of a forward propagating wave and average values of the accumulated amplitude and phase samples of a reflected wave.

19. The transmitter of claim 18,
wherein the calculator determines the average values of the amplitude and phase samples of the forward propagating wave and of the reflected wave after a number of the accumulated amplitude and phase samples exceeds a predetermined number.

20. The transmitter of claim 18,
wherein the calculator determines the average values of amplitude and phase samples of the forward propagating wave and of the reflected wave after a predetermined time has elapsed.

* * * * *